United States Patent Office 3,515,448
Patented June 2, 1970

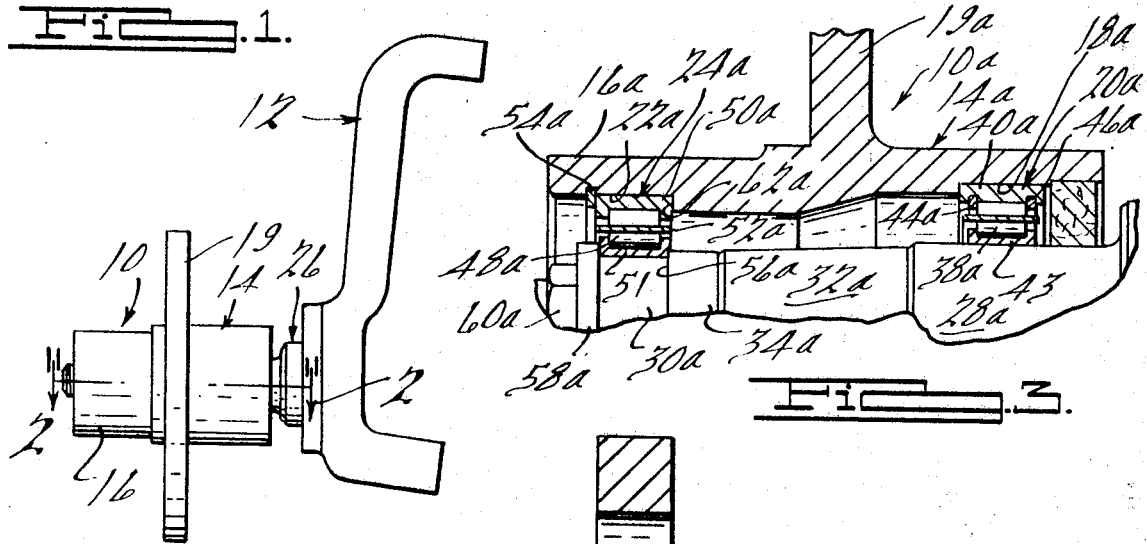
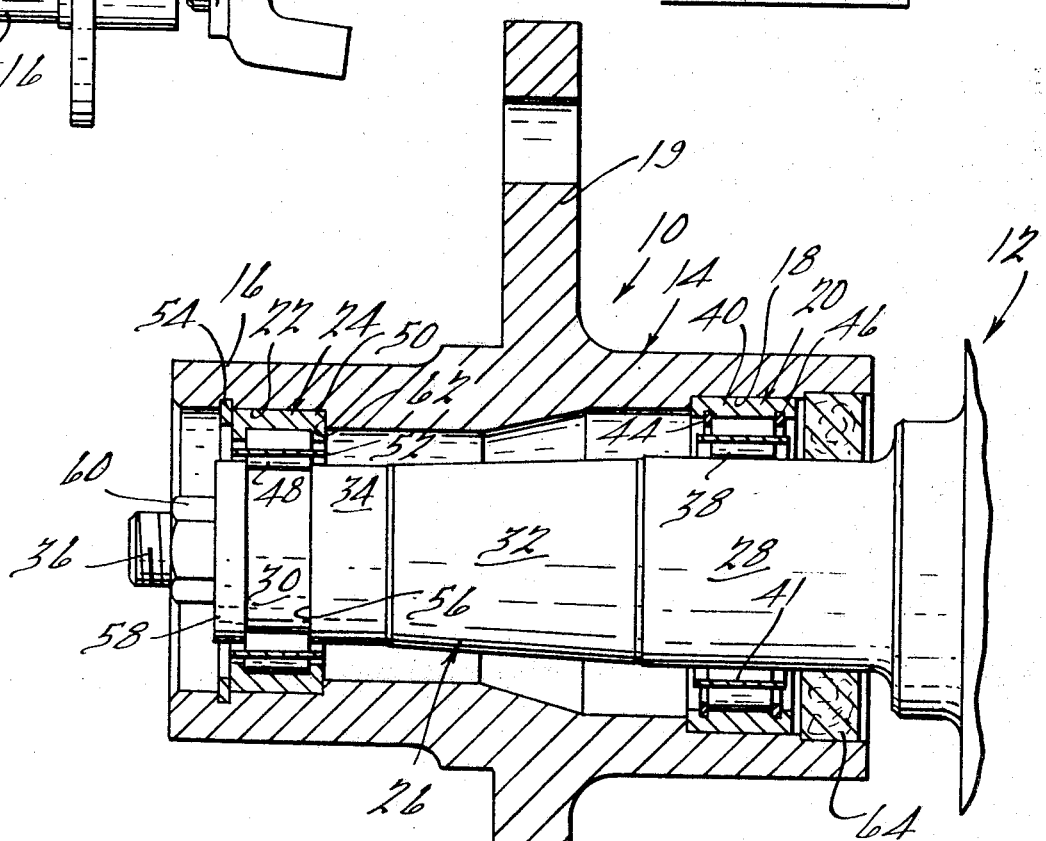
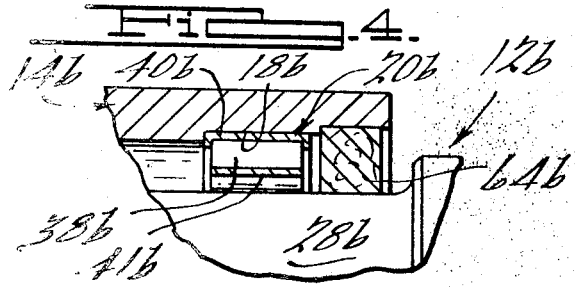

3,515,448
WHEEL BEARING ASSEMBLY CONSTRUCTION
Charles W. Williams and Elmer C. Jensen, Birmingham, Mich., assignors to Federal-Mogul Corporation, Southfield, Mich., a corporation of Michigan
Filed Dec. 9, 1968, Ser. No. 782,112
Int. Cl. F16c *19/22*
U.S. Cl. 308—208                      11 Claims

ABSTRACT OF THE DISCLOSURE

A new wheel bearing assembly utilizing cylindrical roller bearings which are adapted to take thrust.

SUMMARY BACKGROUND OF THE INVENTION

This invention relates generally to wheel bearing constructions and more specifically to a wheel bearing construction utilizing cylindrical roller bearings adapted to take thrust and which construction is particularly suitable for front wheel applications for automotive vehicles.

In automotive applications it is conventional to use ball bearings or tapered roller bearings for the front wheels which bearings inherently accept thrust loads. In the present invention cylindrical roller bearings are utilized and are adapted to take thrust loads. The use of cylindrical roller bearings results in a more compact construction which can be important in front wheel assemblies where space and clearance are at a premium. In the present invention the bearing rollers can be supported directly upon the support spindle, i.e. no inner race or ring, thereby further providing for a more compact construction.

Therefore, it is an object of the present invention to provide a novel wheel bearing construction.

It is another object of the present invention to provide a novel wheel bearing construction utilizing cylindrical roller bearings adapted to take thrust loads.

It is another object to provide a novel wheel bearing construction utilizing cylindrical roller bearings adapted to take thrust loads and in which the rollers are supported directly upon the spindle.

In prior front wheel bearing constructions inner and outer bearings are used and conventionally have been assembled onto a spindle with the inner bearing engageable with a shoulder on the spindle to restrict axial movement in the one direction and with the outer bearing engageable with a washer held at the end of the spindle by a nut to restrict axial movement in the other direction. The bearings when properly assembled have no preload and may have minimal end play. However, assembly of the bearings can be critical; if the nut is overly tightened, the rollers will be excessively loaded and premature failure will result; if the nut is not threaded on sufficiently, excessive end play can occur again resulting in premature failure. In the present invention a construction is provided in which the bearing assembly conditions, i.e. end play, are not determined by assembly forces and hence the above problems are eliminated. Therefore, it is another object to provide a bearing construction of the above type in which the assembly force does not provide a bearing preload and does not affect end play.

Other objects, features, and advantages of the present invention will become apparent from the subsequent description and the appended claims, taken in conjunction with the accompanying drawinis, in which:

FIG. 1 is a side elevational view of a wheel bearing assembly in assembly relationship to a front wheel spindle for a vehicle;

FIG. 2 is an enlarged sectional view taken generally along the line 2—2 in FIG. 1;

FIG. 3 is a fragmentary sectional view to reduced scale of a modified wheel bearing assembly; and FIG. 4 is a fragmentary sectional view of a modified wheel bearing assembly.

Looking now to the drawing, a hub and bearing assembly 10 of a front wheel assembly is shown supported upon a steering knuckle 12 which steering knuckle can be generally of a conventional construction and of the type utilized for a front wheel assembly of an automotive vehicle. The hub and bearing assembly 10 includes a hub 14 having a generally tubular body portion 16 with a radial flange 19 which is adapted to receive a brake drum and a wheel (not shown).

The hub 14 has an enlarged diameter counter-bore 18 at its inner end for receiving an inner bearing assembly 20 and a reduced diameter counter-bore 22 at its outer end for receiving an outer bearing assembly 24. The bearing assemblies 20 and 24 are cylindrical roller bearings and rotatably support the hub 14 upon a spindle 26 of the steering knuckle 12. The spindle 26 is generally tapered from its inner to its outer end and has an enlarged diameter portion 28 at its inner end upon which is rotatably mounted the inner bearing assembly 20 and has a reduced diameter portion 30 at its outer end upon which is rotatably mounted the outer bearing assembly 24. A tapered portion 32 extends outwardly from portion 28 and terminates at a straight portion 34 adjacent support portion 30. The portion 34 is of a larger diameter than the bearing support portion 30 and defines therewith a shoulder 56. The outer end of the spindle 26 terminates in a threaded stud portion 36.

The larger diameter inner bearing assembly 20 has a plurality of cylindrical roller members 38 supported for rotation in an outer ring 40. The roller members 38 are retained by a cage 41 of a known construction. The roller members 38 are radially held to ring 40 by cage 41 and are axially held by a pair of snap rings 44 and 46.

The small diameter outer bearing assembly 24 comprises a plurality of cylindrical rollers 48 which are rotatably supported in an outer ring 50. The outer ring 50 is of a double shoulder construction whereby the rollers 48 are axially retained. A cage 52, like cage 41, retains the rollers 48. The outer ring or race member 40 of the large inner bearing assembly 20 is located with a press fit in the large diameter counter-bore 18 of the hub 14 while the outer ring or race 50 of the small outer bearing assembly 24 is located with a press fit in the small diameter counter-bore 22 of the hub 14 and is additionally axially retained by a snap ring 54 at the outer end and by a shoulder 62 at the inner end.

The rollers 48 of the outer bearing assembly 24 are engageable at their inner ends with the shoulder 56 on the spindle 26. The outer ends of rollers 48 are engageable with a hardened washer 58 which is held against the outer surface of the support portion 30 by means of a nut 60 threaded upon the stud portion 36. Thus the rollers 48 are held in a close clearance relationship, from axial movement in one direction by the shoulder 56 and in the opposite direction by the washer 58. Thus axial thrust loads applied to the hub 14 in one direction will be taken by the outer bearing assembly 24 by virtue of the retaining ring 54 in the outer race 50 which acts against the rollers 48 which are axially restrained by the shoulder 56. For axial thrust loads in the opposite direction, shoulder 62 on hub 14 acts on the outer race member 50 which in turn acts on the rollers 48 which are axially restrained by the hardened washer member 58. The washer 58 is hardened to around 58–60 R$_c$ to provide good wear resistance.

A seal member 64 is located at the inner end of the body portion 16 of the hub 14 and cooperates with the large diameter portion 28 of the spindle 26 to seal the inner end of the hub 14. The outer end of the body portion 16 of the hub 14 can be sealed by means (not shown) to maintain lubricant within the confines of the body portion 16.

Note that with the use of cylindrical roller bearing assemblies 20 and 24, the rollers 38 and 48 can be supported directly on the spindle 26, i.e. no separate inner race. The spindle support portions 28 and 30 are hardened to around 58–60 $R_c$ to provide good wear resistance. The use of cylindrical bearings also permits a more compact construction resulting in increased clearance around the hub 14.

Note that the inner bearing assembly 20 can axially move or float with the hub 14, thus in assembly of the hub 14 and bearing assemblies 20 and 24 to the spindle 26 in tightening the nut 60 no axial load is applied to either of the bearing assemblies 20 or 24 and any end play is preselected to that desired amount and will not vary in assembly. Thus the assembly torque or force on the nut 60 is not critical since the nut 60 need be tightened sufficiently to hold the washer 58 and as tightened does not affect the loading or end play of the bearings.

FIG. 3 shows a modified construction in which inner races are provided for the bearing assemblies; in the construction of FIG. 3 components similar to like components in the construction of FIGS. 1 and 2 have been given the same numeral designation with the addition of the letter postscript *a*. Thus in FIG. 3 bearing assemblies 20*a* and 24*a* have inner races 43 and 51, respectively.

FIG. 4 shows a further modification to the construction of FIG. 2 in which the inner bearing 20 has a modified outer race 40*b* which is of a thin wall construction (outer bearing 24 would remain unchanged). The wall of race 40*b* could be around .090" in contrast to a conventional race of a thickness of .180". The use of the thin wall race 40*b* permits a further reduction in hub size and an increase in clearance or an increase in spindle size with no increase in clearance. A heavier wall outer race 50 for outer bearing 24 would still be used since that race is adapted to accept thrust loads; the thin wall race 40*b* is not subjected to thrust loads. In the drawing of FIG. 4 components similar to like components in the construction of FIGS. 1 and 2 have been given the same numeral designation with the addition of the letter postscript *b*.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:
1. A wheel bearing assembly comprising: a hub, a spindle portion, a pair of cylindrical roller bearing assemblies connected to said hub and supported on said spindle portion for rotatably supporting said hub, a shoulder on said spindle for restraining axial movement of one of said bearing assemblies in one axial direction and retaining means independent of the other of said bearing assemblies and associated with said spindle for restraining axial movement of said one of said bearing assemblies in the opposite axial direction whereby axial thrust loads are taken by said one of said bearing assemblies via said shoulder and said retaining means.

2. The assembly of claim 1 with said other bearing assembly being generally free to float axially on said spindle whereby the axial thrust loads are taken solely by said one bearing assembly.

3. The assembly of claim 2 with said bearing assemblies having their rollers supported directly on support portions of said spindle portion, with said support portions being hardened to provide good wear surfaces.

4. The assembly of claim 2 with said one bearing assembly being located proximate the outer end of said spindle portion.

5. The assembly of claim 4 with said retaining means comprising a washer removably secured to the outer end of said spindle portion and engageable with said one bearing assembly.

6. The assembly of claim 5 with said spindle portion being a part of a steering knuckle.

7. The assembly of claim 6 with said washer being hardened to provide good wear characteristics.

8. The assembly of claim 7 with said bearing assemblies having their rollers supported directly on support portions of said spindle portion, with said support portions being hardened to provide good wear surfaces.

9. The assembly of claim 6 with said bearing assemblies having inner races.

10. The assembly of claim 2 with the outer race of said other bearing assembly being of a thin wall construction in comparison to the wall of the outer race of said one bearing assembly.

11. The assembly of claim 8 with the outer race of said other bearing assembly being of a thin wall construction in comparison to the wall of the outer race of said one bearing assembly.

References Cited

FOREIGN PATENTS 529,330  7/1931  Germany.

MARTIN P. SCHWADRON, Primary Examiner

F. SUSKO, Assistant Examiner